United States Patent
Eggold et al.

(10) Patent No.: US 9,989,972 B2
(45) Date of Patent: Jun. 5, 2018

(54) SYSTEMS AND METHODS TO PREVENT AN AIRCRAFT FROM TAIL CONTACT WITH THE GROUND

(71) Applicant: The Boeing Company, Chicago, IL (US)

(72) Inventors: David P. Eggold, Everett, WA (US); Tristan C. Flanzer, Seattle, WA (US)

(73) Assignee: The Boeing Company, Chicago, IL (US)

( * ) Notice: Subject to any disclaimer, the term of this patent is extended or adjusted under 35 U.S.C. 154(b) by 0 days. days.

(21) Appl. No.: 15/050,296

(22) Filed: Feb. 22, 2016

(65) Prior Publication Data

US 2017/0242444 A1 Aug. 24, 2017

(51) Int. Cl.
| | |
|---|---|
| G05D 1/08 | (2006.01) |
| G05D 1/06 | (2006.01) |
| B64D 45/04 | (2006.01) |
| B64C 13/50 | (2006.01) |

(52) U.S. Cl.
CPC ......... *G05D 1/0676* (2013.01); *B64C 13/503* (2013.01); *B64D 45/04* (2013.01); *G05D 1/0808* (2013.01)

(58) Field of Classification Search
None
See application file for complete search history.

(56) References Cited

U.S. PATENT DOCUMENTS

| | | | | |
|---|---|---|---|---|
| 4,536,843 A | * | 8/1985 | Lambregts | G05D 1/0638 244/181 |
| 5,527,002 A | | 6/1996 | Bilange et al. | |
| 5,901,927 A | * | 5/1999 | Ho | G05D 1/0676 244/183 |
| 6,121,899 A | | 9/2000 | Theriault | |
| 6,422,517 B1 | | 7/2002 | DeWitt et al. | |
| 6,583,733 B2 | * | 6/2003 | Ishihara | B64D 45/04 340/946 |
| 6,737,987 B2 | * | 5/2004 | Conner | B64C 27/82 244/17.11 |
| 6,761,336 B2 | | 7/2004 | DeWitt et al. | |
| 8,214,089 B2 | * | 7/2012 | Caldeira | G05D 1/0833 244/181 |
| 9,317,042 B2 | * | 4/2016 | Greenfield | G05D 1/0858 |

(Continued)

FOREIGN PATENT DOCUMENTS

| | | |
|---|---|---|
| EP | 1 727 012 A1 | 11/2006 |
| WO | WO 01/40051 A2 | 6/2001 |

*Primary Examiner* — Thomas G Black
*Assistant Examiner* — Demetra R Smith-Stewart
(74) *Attorney, Agent, or Firm* — Haynes and Boone, LLP

(57) ABSTRACT

Systems and methods according to one or more embodiments are provided for limiting elevator deflection commands to avoid the aft body of an aircraft from contacting the ground during a landing maneuver. In one example, a system includes a memory configured to store a plurality of executable instructions and a processor. The processor is configured to determine a descent profile and a current pitch profile. A pre-determined maximum pitch profile associated with the descent profile is used to compare to the current pitch profile. The comparison is used to compute an elevator deflection value that limits an elevator command signal in order to avoid a tail strike. Additional systems and methods are also provided.

19 Claims, 7 Drawing Sheets

(56) References Cited

U.S. PATENT DOCUMENTS

2009/0138144 A1\* 5/2009 Flannigan ............ G05D 1/0676
   701/5
2015/0123821 A1\* 5/2015 Greene .................. B64D 45/04
   340/967

\* cited by examiner

SYSTEMS AND METHODS TO PREVENT AN AIRCRAFT FROM TAIL CONTACT WITH THE GROUND

TECHNICAL FIELD

The present invention relates generally to aircraft flight control, and more particularly, for example, to avoiding aircraft tail contact with the ground.

BACKGROUND

In the field of aircraft control, there is an ongoing effort to improve methods for tail strike avoidance. A tail strike is an event where the aft body of an airplane contacts the runway during takeoff, landing, or go-around. Tail strikes levy an economic cost on airlines because when they occur, aircraft must be pulled from service to be inspected and if necessary repaired. Tail strikes are rare and can typically be avoided through proper operation of the aircraft. When proper operation is not maintained, is not possible, or environmental factors dictate, a control law can provide protection for the aft body.

SUMMARY

Systems and methods are disclosed herein in accordance with one or more embodiments that provide an improved approach to avoiding aircraft tail strikes during landing maneuvers. In some embodiments, a maximum pitch profile may be determined to limit an elevator deflection command to avoid a tail strike. In one example, an aircraft geometry is used to determine a predefined maximum pitch profile. The maximum pitch profile is compared to a current pitch profile to determine an excess current pitch profile. The excess current pitch profile is converted to an incremental elevator deflection value by multiplication with a proportional gain term. A lagged current elevator deflection value is summed with the incremental elevator deflection value to produce a nose-up elevator deflection limit.

In one embodiment, a method includes determining an aircraft descent profile based on a current altitude and a current vertical speed of an aircraft; determining a maximum pitch profile associated with the descent profile; determining a current pitch profile based on a current pitch attitude and a current pitch rate of the aircraft; comparing the current pitch profile with the maximum pitch profile to determine an excess current pitch profile; and limiting an elevator command signal based on the comparison to reduce a probability of an aircraft tail strike.

In another embodiment, a system includes a memory comprising a plurality of executable instructions; and a processor adapted to execute the instructions to: determine a descent profile based on a current altitude and a current vertical speed of an aircraft; determine a maximum pitch profile associated with the descent profile; determine a current pitch profile based on a current pitch attitude and a current pitch rate of the aircraft; compare the current pitch profile with the maximum pitch profile to determine an excess current pitch profile; and limit an elevator command signal based on the comparison.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

Techniques are provided to avoid a tail strike during an aircraft landing maneuver by determining a maximum allowable degrees of elevator deflection to prevent the aft body of the aircraft from contacting the ground. The elevator is a primary control surface of an aircraft, providing longitudinal control. The elevator is flap-like and is deflected up and down. The main objective of elevator deflection is to increase or decrease tailplane lift and tailplane pitching moment. A negative elevator deflection generates a positive pitching motion causing the aircraft tail to rotate downward. A positive elevator deflection generates a negative pitching motion causing the aircraft tail to rotate upward.

In various embodiments, a tail strike avoidance system determines a maximum allowable degrees of elevator deflection based on a descent profile and a current pitch profile. The descent profile may be calculated, for example, based on a current altitude and a current vertical speed. The current altitude (e.g., a current altitude from an aircraft landing gear to a runway surface) may be determined, at least in part, from a radio altimeter measurement signal and/or various other sensors capable of providing altitude measurement signals. The current vertical speed may be determined from a vertical speed sensor measurement signal. The current pitch profile may be calculated based on a pitch attitude and a pitch rate. Pitch attitude may be determined from a pitch attitude sensor measurement signal and pitch rate may be determined from a pitch rate sensor measurement signal.

Furthermore, the descent profile and the current pitch profile may be used to determine a maximum pitch profile and an excess pitch profile value. A predefined maximum pitch profile may be determined, for example, based on the descent profile. The maximum pitch profile may be compared to the current pitch profile to determine an excess pitch profile value. The excess pitch profile value is converted to a maximum allowable degrees of elevator deflection. The maximum allowable degrees of elevator deflection is used to limit an elevator command signal to prevent the aft body of the aircraft from contacting the ground.

In various embodiments, the processing techniques described herein may be advantageously used to allow an aircraft, such as a long bodied commercial aircraft, to use a lower landing approach speed than would otherwise be necessary to avoid tail strikes. A pilot may rely on increased landing speed to avoid a tail strike in conventional systems. Lower approach speeds can have a positive effect on a number of aircraft systems and performance metrics including landing field length, high lift, and noise.

Figure 1:
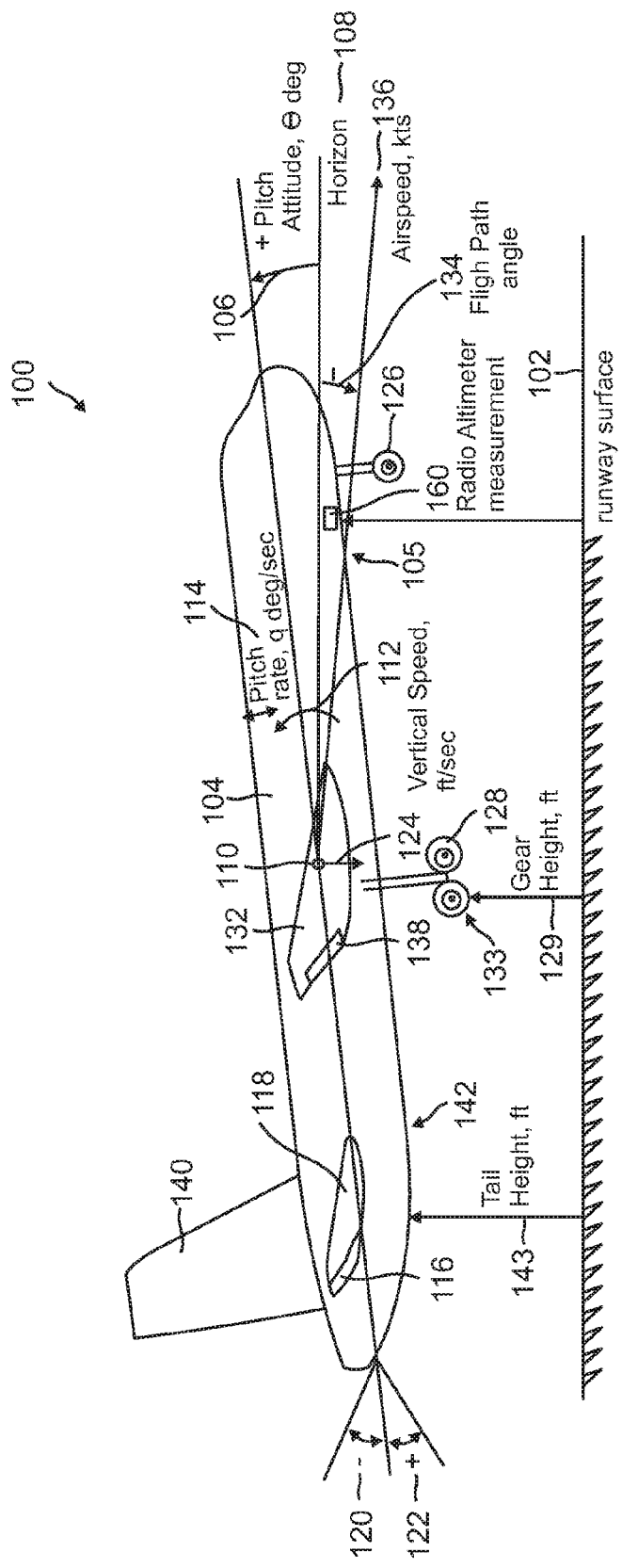
FIG. 1 illustrates a diagram of an aircraft in a landing maneuver in accordance with an embodiment of the disclosure.

FIG. 1 illustrates a diagram of an aircraft 100 in a landing maneuver in accordance with an embodiment of the disclosure. In some embodiments, aircraft 100 of FIG. 1 may be long bodied commercial aircraft. In other embodiments, aircraft 100 may be any aircraft, for example, using a runway surface 102 for a landing maneuver. As shown in FIG. 1, aircraft 100 may be oriented above runway surface 102 in a flared position. In this regard, fuselage 104 may be oriented with a positive (e.g., +) pitch attitude 106 relative to a horizon 108. Positive pitch attitude 106 may correspond to aircraft 100 nose-up, and aft body 142 in a downward rotation toward runway surface 102. Furthermore, aircraft 100 may be rotating around a center of gravity 110 in a longitudinal pitching moment 112 at a pitch rate 114. Pitch rate 114 is, at least in part, dependent on the magnitude of change of negative elevator deflection 120 and/or positive elevator deflection 122.

In some embodiments, an aircraft pilot and/or co-pilot may exert a control column force to generate an elevator deflection command signal (e.g., such as elevator command signal 320 of FIG. 3) to adjust an elevator 116. In other embodiments, an autopilot may generate an elevator deflection command signal to adjust an elevator 116. The elevator command signal may command elevator 116 to respond with a negative elevator deflection 120 generating a positive (e.g., nose up) pitching moment 112. A negative elevator deflection 120 may cause aircraft 100 aft body 142 to rotate in a downward direction toward runway surface 102 and reduce tail height 143 clearance to runway surface 102. Elevator command signal may command elevator 116 to respond with a positive elevator deflection 122 generating a negative (e.g., nose down) pitching moment 112. A positive elevator deflection 122 may cause aircraft 100 aft body 142 to rotate in an upward direction away from runway surface 102 and increase tail height 143 clearance to runway surface 102. Elevator 116 may be mechanically coupled to a horizontal stabilizer 118. Horizontal stabilizer may be mechanically coupled to fuselage 104 at the aircraft 100 aft body 142.

As shown in FIG. 1, aircraft 100 may be descending toward runway 102 with nose landing gear 126 and main landing gear 128 fully extended. Radio altimeter 160 measurement signal provides a distance from a lower surface 105 in the forward part of aircraft 100 to runway surface 102. Radio altimeter measurement signal may be used, in part, to compute a distance from main landing gear 128 to runway surface 102. Distance from main landing gear 128 to runway surface 102 (e.g., gear height) may be determined, in part, using measurement signals from radio altimeter 160. A conversion from radio altimeter 160 to landing gear 128 may be calculated to provide a gear height measurement (e.g., current altitude). A conversion from radio altimeter 160 measurement signal to main landing gear 128 may include, for example, a length determined by a distance from a lower surface 133 of extended main landing gear 128 to lower surface 105 of fuselage 104. Furthermore, inertial motion data (e.g., a vertical speed 124, and a pitch attitude 106) may be combined with the length to determine a current altitude 129. Vertical speed 124 may provide a rate of closure (e.g., a sink rate) to runway surface 102 during descent of aircraft 100.

As shown in FIG. 1, a negative flight path angle 134 may be determined as the angle of an airplane airspeed 136 from horizon 108 as aircraft 100 is descending. In some embodiments, airspeed 136 may be the indicated airspeed of aircraft 100 during descent toward runway 102. Aileron 138 may be mechanically coupled to wing 132 to provide a change to roll of aircraft 100. Vertical stabilizer 140 may be mechanically coupled to fuselage 104 to provide a yaw control of aircraft 100.

Figure 2:
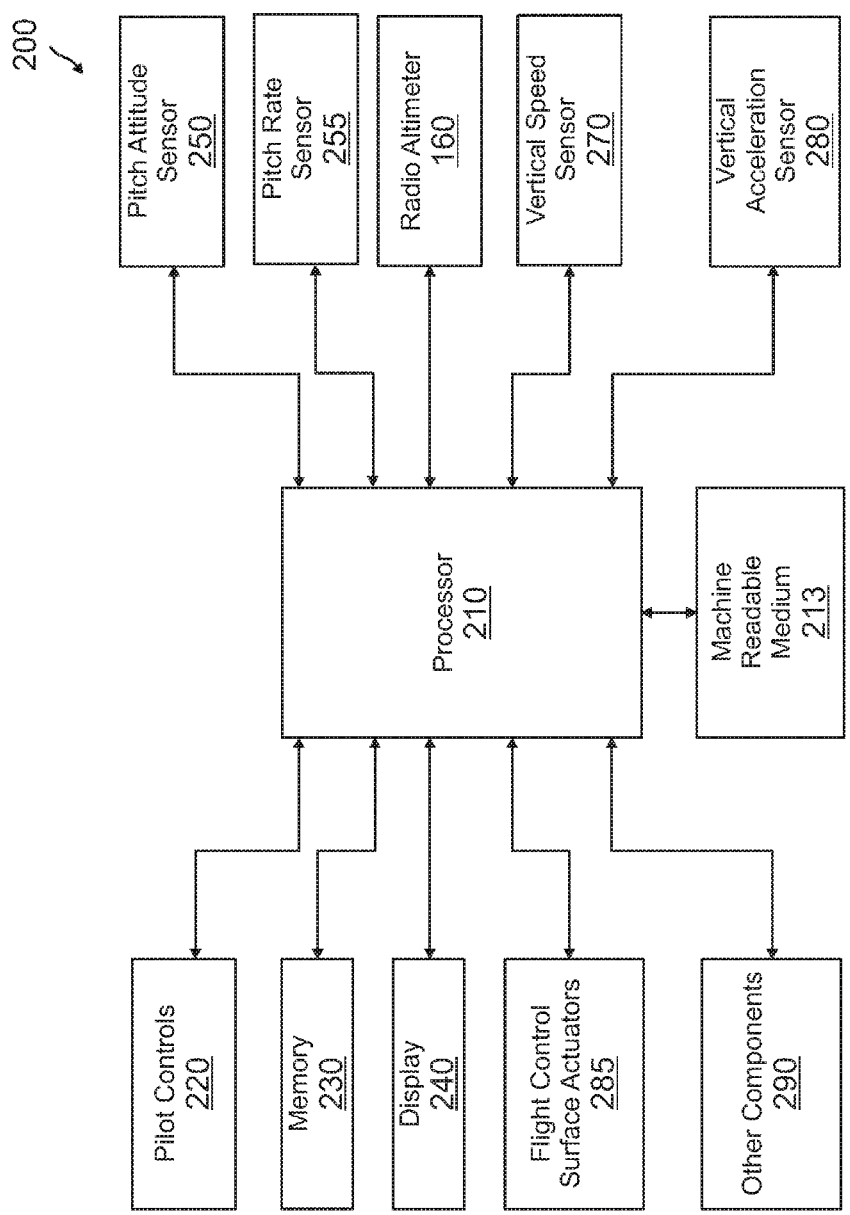
FIG. 2 illustrates a block diagram of an aircraft flight control system in accordance with an embodiment of the disclosure.

FIG. 2 illustrates a block diagram of an aircraft flight control system 200 of aircraft 100 in accordance with an embodiment of the disclosure. Flight control system 200 may be used to receive sensor measurement signals from various sensors within flight control system 200 to determine aircraft pitch attitude 106, pitch rate 114, vertical speed 124, and current altitude 129, among other aircraft parameters. Flight control system 200 may be used to compute one or more descent and/or pitch profile values and determine a limit for an elevator deflection based on pitch and descent profiles in accordance with various techniques described herein. In one embodiment, various components of flight control system 200 may be distributed within aircraft 100. In one embodiment, flight control system 200 includes a processor 210, a pilot controls 220, a memory 230, a display 240, a pitch attitude sensor 250, a pitch rate sensor 255, a radio altimeter 160, a vertical speed sensor 270, a vertical acceleration sensor 280, and other components 290.

Processor 210 may include, for example, a microprocessor, a single-core processor, a multi-core processor, a microcontroller, a logic device (e.g., a programmable logic device configured to perform processing operations), a digital signal processing (DSP) device, one or more memories for storing executable instructions (e.g., software, firmware, or other instructions), and/or any other appropriate combinations of processing device and/or memory to execute instructions to perform any of the various operations described herein. Processor 210 is adapted to interface and communicate with components 160, 220, 230, 240, 250, 255, 270, and 280 to perform method and processing steps as described herein.

In various embodiments, it should be appreciated that processing operations and/or instructions may be integrated in software and/or hardware as part of processor 210, or code (e.g., software or configuration data) which may be stored in memory 230. Embodiments of processing operations and/or instructions disclosed herein may be stored by a machine readable medium 213 in a non-transitory manner (e.g., a memory, a hard drive, a compact disk, a digital video disk, or a flash memory) to be executed by a computer (e.g., logic or processor-based system) to perform various methods disclosed herein.

In various embodiments, the machine readable medium 213 may be included as part of flight control system 200 and/or separate from flight control system 200, with stored instructions provided to flight control system 200 by coupling the machine readable medium 213 to flight control system 200 and/or by flight control system 200 downloading (e.g., via a wired or wireless link) the instructions from the machine readable medium (e.g., containing the non-transitory information).

Memory 230 includes, in one embodiment, one or more memory devices (e.g., one or more memories) to store data and information. The one or more memory devices may include various types of memory including volatile and non-volatile memory devices, such as RAM (Random Access Memory), ROM (Read-Only Memory), EEPROM (Electrically-Erasable Read-Only Memory), flash memory, or other types of memory. In one embodiment, processor 210 is adapted to execute software stored in memory 230 and/or machine-readable medium 213 to perform various methods, processes, and operations in a manner as described herein.

Flight control system 200 includes, in one embodiment, one or more sensors for providing flight control data signals to processor 210. In one embodiment, sensors include a pitch attitude sensor 250, a pitch rate sensor 255, a vertical speed sensor 270, a vertical acceleration sensor 280, and a radio altimeter 160. Sensors of flight control system 200 provide for sensing inertial motion (e.g., inertial motion measurement signals from sensors 250, 255, 270, and/or 280) and altitude (e.g., altitude measurement signals from radio altimeter 160) of aircraft 100. In some embodiments, sensors 250, 255, 270, 280, and/or 160 may be implemented as discrete hardware devices. Sensors may provide sensor measurement signals (e.g., sensor data) for computing descent and pitch profile values, for example, current altitude 129, vertical speed 124, current pitch attitude 106, and current pitch rate 114.

Processor 210 may be adapted to receive sensor data from sensors, process sensor data, store sensor data in memory 230, and/or retrieve stored sensor data from memory 230. In various aspects, sensors may be remotely positioned and processor 210 may be adapted to remotely receive sensor measurement signals from sensors via wired or wireless communication buses within aircraft 100. Processor 210 may be adapted to process sensor data stored in memory 230 to provide sensor data to display 240 for viewing by a user.

Display 240 includes, in one embodiment, a display device (e.g., a liquid crystal display (LCD)) or various other types of generally known video displays, monitors, and/or gauges for use with aircraft flight control system 200. Processor 210 may be adapted to display sensor data and information on display 240. Processor 210 may be adapted to retrieve sensor data and information from memory 230 and display any retrieved sensor data and information on display 240. Display 240 may include display electronics, which may be utilized by processor 210 to display sensor data and information. Display 240 may receive sensor data and information directly from one or more sensors (e.g., sensors 250, 255, 160, 270, and/or 280) via processor 210, or the sensor data and information may be transferred from memory 230 via processor 210.

Pilot controls 220 include, in one embodiment, a user input and/or interface device having one or more user actuated components, such as a stick, a yoke, and/or other control devices that are adapted to generate one or more user actuated input control signals. In another embodiment, pilot controls 220 include an autopilot system providing the same or similar control signals. Processor 210 may be adapted to sense control input signals from pilot controls 220 and respond to any sensed control input signals received therefrom. For example, in some embodiments, pilot controls 220 may provide control input signals via a control device to adjust primary flight control surfaces. In various embodiments, it should be appreciated that pilot controls 220 may be adapted to include one or more other user-activated mechanisms to provide various other control operations of flight control system 200, such as navigation, communication, pitch control, roll control, yaw control, thrust control, and/or various other features and/or parameters.

Other types of pilot controls 220 may be contemplated, such as, a graphical user interface (GUI), which may be integrated as part of display 240 (e.g., a user actuated touch screen), having one or more images of the user-activated mechanisms (e.g., buttons, knobs, sliders, or others), which are adapted to interface with a user and receive user input control signals via the display 240. As an example for one or more embodiments as discussed further herein, display 240 and pilot controls 220 may represent appropriate portions of a tablet, a laptop computer, a desktop computer, or other type of device. Furthermore, pilot controls 220 may be adapted to be integrated as part of display 240 to operate as both a user input device and a display device, such as, for example, a touch screen device adapted to receive input signals from a user touching different parts of the display screen.

Flight control surface actuators 285 include, in one embodiment, actuators to control aircraft 100 primary flight control surfaces. Primary flight control surfaces may include elevator 116. In some embodiments, a pilot and/or co-pilot may adjust a longitudinal pitch attitude 106 of aircraft 100 by applying a control column force or position to adjust elevator 116 of horizontal stabilizer 118. Control column force may generate an elevator command signal (e.g., such as elevator command signal 320 of FIG. 3) to adjust an elevator deflection (e.g., elevator deflection 120 and/or 122). In other embodiments, an autopilot system (e.g., provided as part of pilot controls 220) may generate an elevator command signal to adjust an elevator deflection 120 and/or 122. Processor 210 may receive elevator command signal 320 and provide a corresponding elevator deflection signal (e.g., such as elevator deflection signal 326 of FIG. 3B provided to an elevator actuator) to adjust elevator 116 of horizontal stabilizer 118.

Other primary flight control surfaces may be located on wing 132 and vertical stabilizer 140. Processor 210 may receive a command from pilot controls 220 to adjust an aileron 138 coupled to wing 132 to provide a change to roll of aircraft 100. Processor 210 may receive a command from pilot controls 220 to adjust vertical stabilizer 140 (e.g., by adjustment of a movable rudder as part of vertical stabilizer 140) to provide a yaw control of aircraft 100.

In another embodiment, flight control system 200 may include other components 290, including environmental and/or operational sensors, depending on the sensed application or implementation, which provide information to processor 210 (e.g., by receiving sensor measurement signals from each of other components 290). In one embodiment, other components 290 may include a discrete switch (e.g., such as switch 322 of FIG. 3B). Discrete switch 322 may be controlled by processor 210 to couple and/or uncouple elevator command signal 320 to limiter 319 to activate tail strike avoidance. In various embodiments, other components 290 may be adapted to provide signal data and information related to operating and/or environmental conditions, such as internal and/or external temperature conditions, lighting conditions (e.g., beacons mounted on wing 132 and/or fuselage 104) and/or distance (e.g., laser rangefinder). Accordingly, other components 290 may include one or more conventional sensors as would be known by those skilled in the art for monitoring various conditions (e.g., environmental and/or operational conditions) on aircraft 100.

Figure 3A:
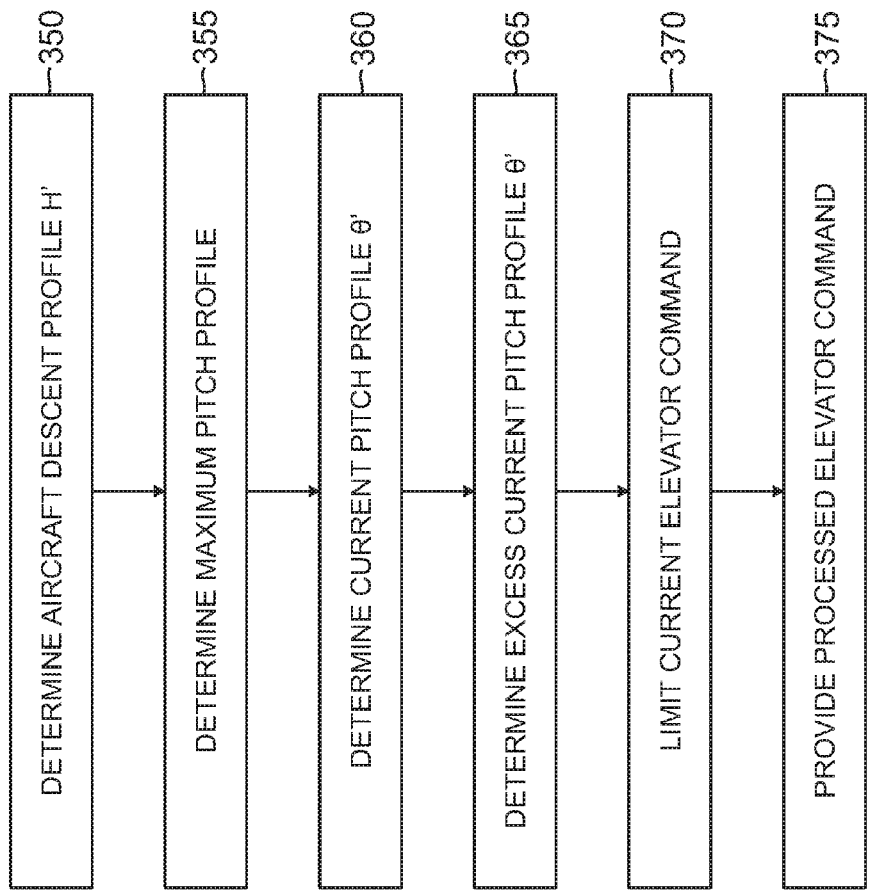
FIGS. 3A and 3B illustrate processes to selectively limit elevator deflection to avoid tail strikes by an aircraft in accordance with embodiments of the disclosure.
Figure 3B:
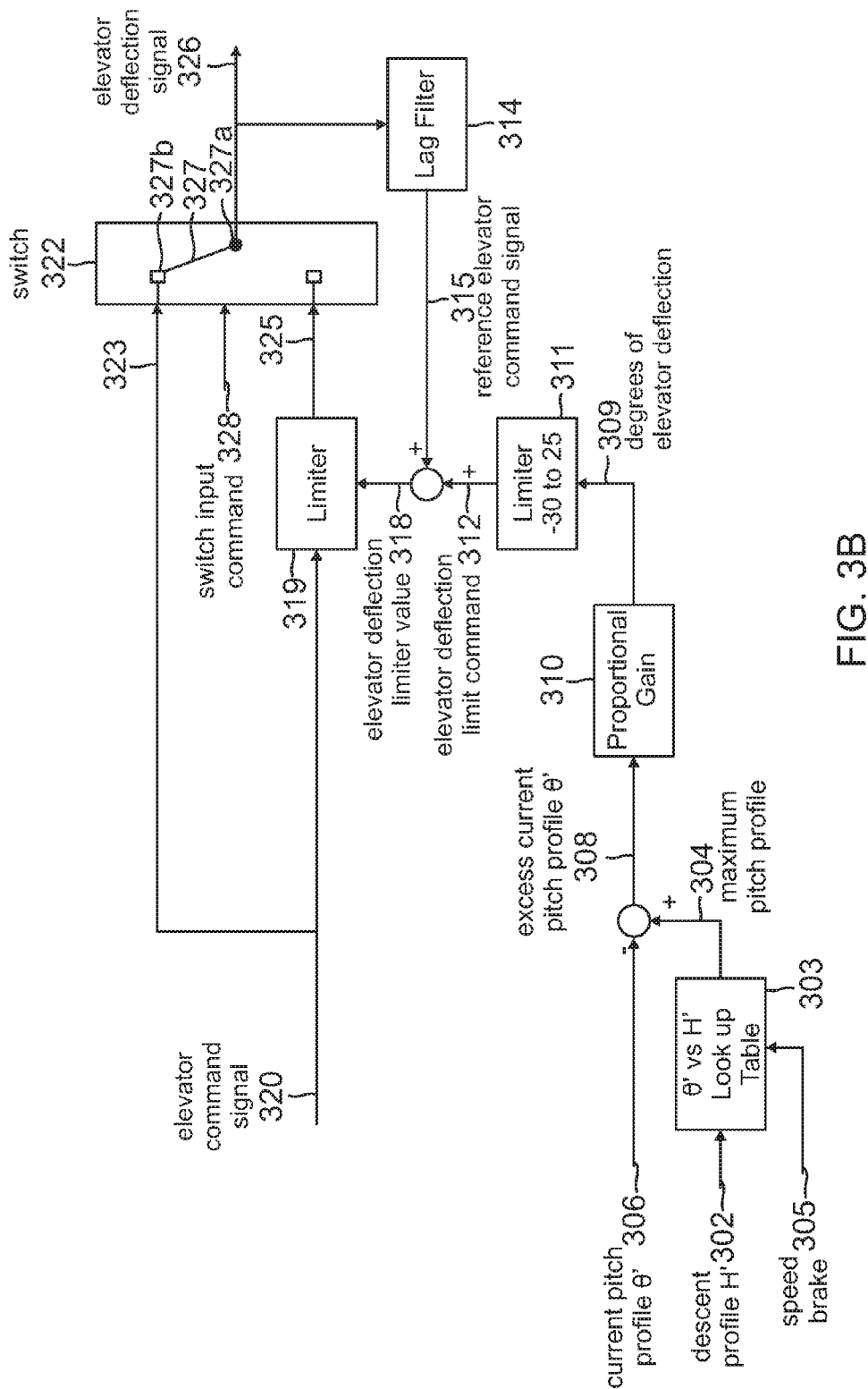

FIGS. 3A and 3B illustrate processes to selectively limit elevator deflection to avoid tail strikes by an aircraft 100 in accordance with embodiments of the disclosure. In various embodiments, the processes of FIGS. 3A and 3B may be performed, for example, by processor 210 of aircraft 100. In particular, FIG. 3A illustrates an overall process flow, and FIG. 3B provides further details of the various operations. Accordingly, FIG. 3A and FIG. 3B will be described in relation to each other. During the processes of FIGS. 3A and 3B, various data values may be determined from one or more sensors and/or calculated as further discussed herein.

In block 350 of FIG. 3A, a descent profile H' 302 may be computed to determine the position of landing gear 128 in the immediate future relative to runway 102. The descent profile H' 302 may be determined by combining a current altitude of main landing gear 128 and a current vertical speed of landing gear 128. Current altitude 129 may be calculated by combining radio altimeter 160 measurement signal with inertial motion data (e.g., inertial motion data as provided, for example, by pitch attitude sensor 250, pitch rate sensor 255, vertical speed sensor 270 and/or vertical acceleration sensor 280), as described herein. Current vertical speed 124 may be provided to processor 210 by vertical speed sensor 270 measurement signal. Vertical speed 124 may be multiplied by a gain term in the computation of descent profile H' 302.

In block 355, a predetermined maximum pitch profile 304 may be determined from a θ' vs H' look up table 303, using the determined descent profile H' 302 of block 350. θ' vs H' look up table 303 provides a relationship between maximum pitch profile 304 and descent profile H' 302. In this regard, as landing gear 128 approaches runway surface 102, as indicated by the decreasing value of the descent profile H' 302, maximum pitch profile 304 decreases allowing for less positive pitch profile value θ' 306 of aircraft 100. The θ' vs H' look up table 303 may include a plurality of calculated maximum pitch profiles 304, where each maximum pitch profile 304 is based on a corresponding one of a plurality of descent profiles H' 302. Furthermore, maximum pitch profile 304 may be dependent on aircraft 100 geometry, as described herein.

Referring to FIG. 3B, in some embodiments, maximum pitch profile 304 may be reduced when a wing mounted speed brake 305 is extended. Wing mounted speed brake 305 may be actuated by a speed brake command from processor 210 to produce a positive (e.g., nose-up) pitching moment 112. Therefore, a reduction of maximum pitch profile 304 may offset the additional nose-up pitching moment 112 caused by actuation of speed brake 305.

In block 360, processor 210 may compute a current pitch profile θ' 306 to determine a pitch trend of aircraft 100. Current pitch profile θ' 306 may be calculated by combining a current pitch attitude 106 and a current pitch rate 114, where pitch rate 114 may be multiplied by a gain term in the computation of current pitch profile θ' 306. In this regard, an indication of aircraft 100 pitch attitude in the immediate future may be provided to aid in determining if a tail strike is possible. Current pitch attitude 106 may be provided to processor 210 by a measurement signal produced by pitch attitude sensor 250. Current pitch rate 114 may be provided to processor 210 by a measurement signal produced by pitch rate sensor 255.

In block 365, processor 210 may compare current pitch profile θ' 306 to maximum pitch profile 304 to determine an excess current pitch profile θ' 308. If there is excess current pitch profile θ' 308 (e.g., current pitch profile θ' 306 is greater than maximum pitch profile 304), elevator deflection may be limited based on maximum pitch profile 304 to avoid a tail strike. Furthermore, excess current pitch profile θ' 308 may be multiplied by a proportional gain term 310 and the product may be converted to a degrees of elevator deflection 309.

In some embodiments, excess current pitch profile value θ' 308 may be integrated and summed with the proportional gain term 310. In this regard, excess current pitch profile θ' 308 may be converted into a rate of elevator change by an integral gain. The rate of elevator change is integrated to produce an elevator position output (e.g., degrees of elevator deflection). Elevator position output may be summed with proportional gain term 310 to produce degrees of elevator deflection 309.

In some embodiments, degrees of elevator deflection 309 may be verified to be within a range of elevator full authority 311 (labeled Limiter −30 to 25) for aircraft 100. Elevator full authority 311 provides the full range of elevator deflection for aircraft 100. For example, in some embodiments, aircraft 100 elevator full authority 311 may include values of elevator deflection inclusive of negative thirty degrees to positive twenty-five degrees. Elevator full authority 311 may be dependent on aircraft 100 geometry and other aircraft elevator full authority 311 may be identical to, less than, or greater than aircraft 100 elevator full authority. Output of elevator full authority 311 is an elevator deflection limit command 312.

In some embodiments, elevator deflection limit command 312 may be summed with an output of a lag filter 314 (e.g., a reference elevator command signal 315) to produce an elevator deflection limiter value 318 which is provided to a limiter block 319 (labeled Limiter). In this regard, elevator deflection limit command 312 may increment and/or decrement reference elevator command signal 315 to produce elevator deflection limiter value 318. Lag filter 314 may provide a feedback of an output elevator deflection signal 326 to produce reference elevator command signal 315 in degrees of elevator deflection. Lag filter 314 effectively outputs a low frequency elevator deflection signal to control aircraft 100 during a landing maneuver.

Referring to FIG. 3B, current pitch profile θ' 306 is compared to maximum pitch profile 304 to provide an output excess current pitch profile θ' 308. Excess current pitch profile θ' 308 is multiplied by proportional gain term 310 to provide degrees of elevator deflection 309. In some embodiments, degrees of elevator deflection 309 may be compared to elevator full authority 311 (labeled Limiter −30 to 25) to verify elevator deflection value 309 is within the range of elevator deflection of elevator 116 on aircraft 100. Output of elevator full authority 311 is elevator deflection limit command 312. Elevator deflection limit command 312 is summed with lag filter 314 to produce the elevator deflection limiter value 318. Elevator deflection limiter value 318 may be provided to limiter 319 to limit current elevator command signal 320.

In block 370, limiter 319 may limit current elevator command signal 320. In this regard, limiter 319 may impose a lower limit on the elevator command signal values 320 and elevator command signal values 320 greater than elevator deflection limiter value 318 are provided to the output of the limiter 319.

In block 375, processor 210 may provide a limited output elevator deflection signal 326 to elevator 116. Referring to FIG. 3B, lower elevator deflection limiter value 318 may be electrically coupled to limiter 319 to limit elevator command signal 320 through limiter 319. A switch 322 may be coupled to limiter 319 at switch input 325.

Again referring to FIG. 3B, switch 322 may be used to turn on tail strike avoidance during aircraft 100 landing maneuvers and switch off tail strike avoidance during other flight conditions of aircraft 100 such as normal flight cruising maneuvers. In one embodiment, switch 322 is implemented in software code and data in processor 210 to turn on and turn off tail strike avoidance elevator command limiting. In another embodiment, switch 322 is implemented as a physical discrete switch (e.g., as provided by other components 290). In this regard, switch 322 may toggle between receiving elevator command signal 320 output directly and elevator command signal 320 limited by elevator deflection limiter value 318 at limiter 319. Switch 322 may be electrically coupled to elevator command signal 320 at a switch input 323. Switch 322 may be electrically coupled to the output of the limiter block 319 at a switch input 325. Furthermore, a switch wiper 327 may be coupled to output elevator deflection signal 326 at a switch wiper 327 first end 327a. Processor 210 may produce an electrical signal at switch command input 328 to toggle switch wiper 327 between switch input 325 and switch input 323 at a switch wiper 327 second end 327b.

In some embodiments, processor 210 may be configured to periodically update descent profile H' 302 and current pitch profile θ' 306. Furthermore, updated profile values H' 302 and θ' 306 may be used to calculate an updated elevator deflection limiter value 318, as described herein.

Thus, in accordance with various embodiments, elevator command signals 320 may be selectively limited (e.g. by the operation of limiter 319) based on the output of lag filter 314 and various criteria (e.g., descent profile H' 302, current pitch profile θ' 306, maximum pitch profile 304, degrees of elevator deflection 309, elevator deflection limit command 312 and/or other criteria). In other embodiments, other flight control commands may be selectively limited in the same or similar manner.

Figure 4:
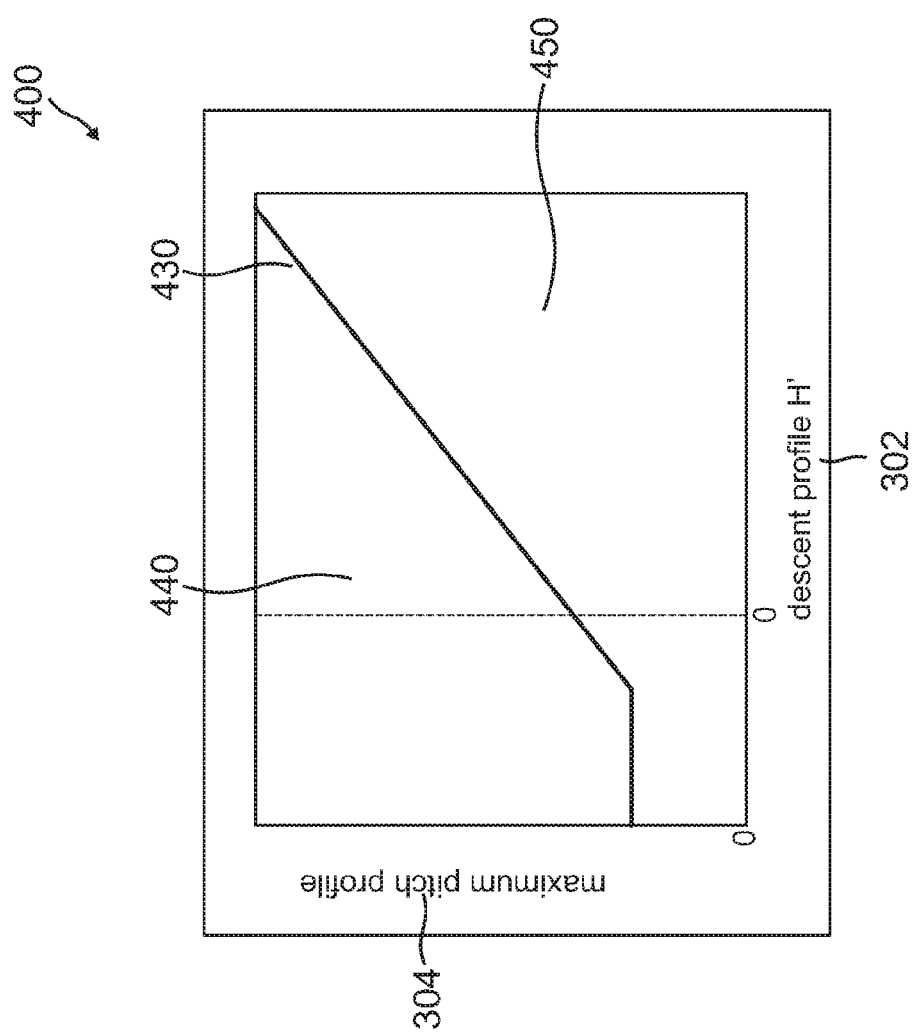
FIG. 4 illustrates a boundary graph of maximum pitch profiles in accordance with an embodiment of the disclosure.

FIG. 4 illustrates a boundary graph 400 of maximum pitch profiles 304 in accordance with an embodiment of the disclosure. Boundary graph 400 provides a plot of the relationship between maximum pitch profile 304 and descent profile H' 302. Boundary graph 400 may provide a plot of the maximum pitch profile 304 under current profile conditions to avoid a tail strike. In this regard, a sloped line 430 represents the maximum pitch profile 304 based on a determined descent profile H' 302. In FIG. 4, the area above sloped line 430 (e.g., area 440) are pitch profiles where current pitch profile θ' 306 exceeds maximum pitch profile 304. In this regard, current pitch profiles θ' 306 in the area of 440 may produce elevator deflection limiter values 318 to generate positive elevator deflection 122 to avoid a tail strike. Conversely, the area below sloped line 430 (e.g., area 450) are pitch profiles 304 where additional current pitch profile θ' 306 may be allowed up to the maximum pitch profile 304 of sloped line 430 while avoiding a tail strike. As shown in FIG. 4, as height of landing gear 128 (e.g., height of landing gear 128 as part of descent profile H' 302) from runway surface 102 increases, allowable maximum pitch profile (e.g., maximum pitch profile 304 as part of sloped line 403) increases.

In various embodiments, maximum pitch profiles 304 are dependent on descent profile H' 302 and aircraft 100 geometry. Aircraft 100 geometry includes a landing gear compression value and is aircraft dependent. In this regard, each type of aircraft may include a unique θ' vs H' look up table 303.

Figure 5A:
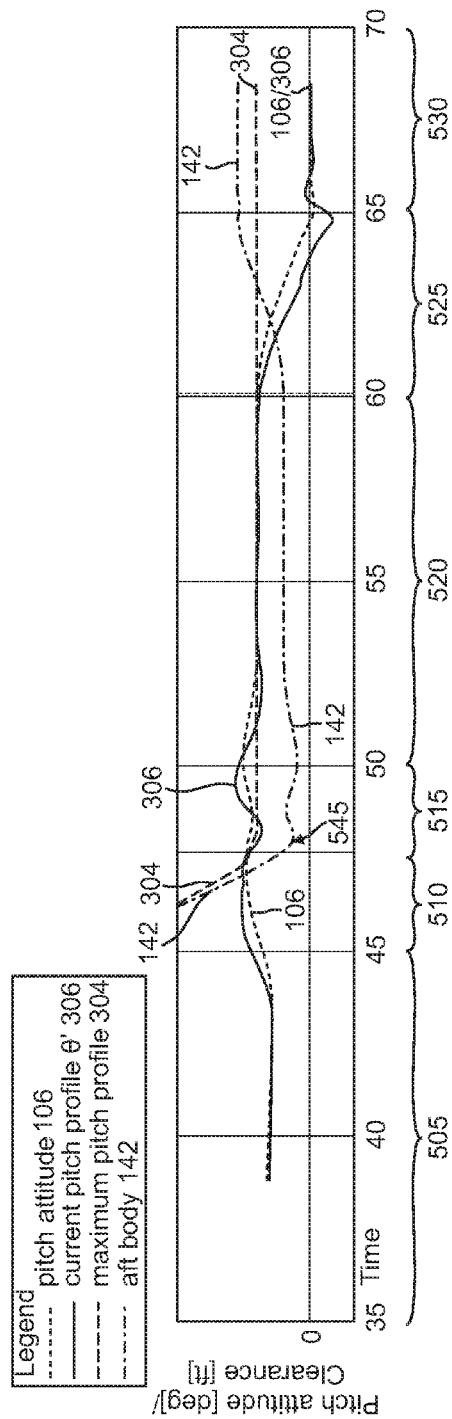
FIGS. 5A through 5C illustrate time sequence plots of an aircraft landing maneuver in accordance with embodiments of the disclosure.
Figure 5B:
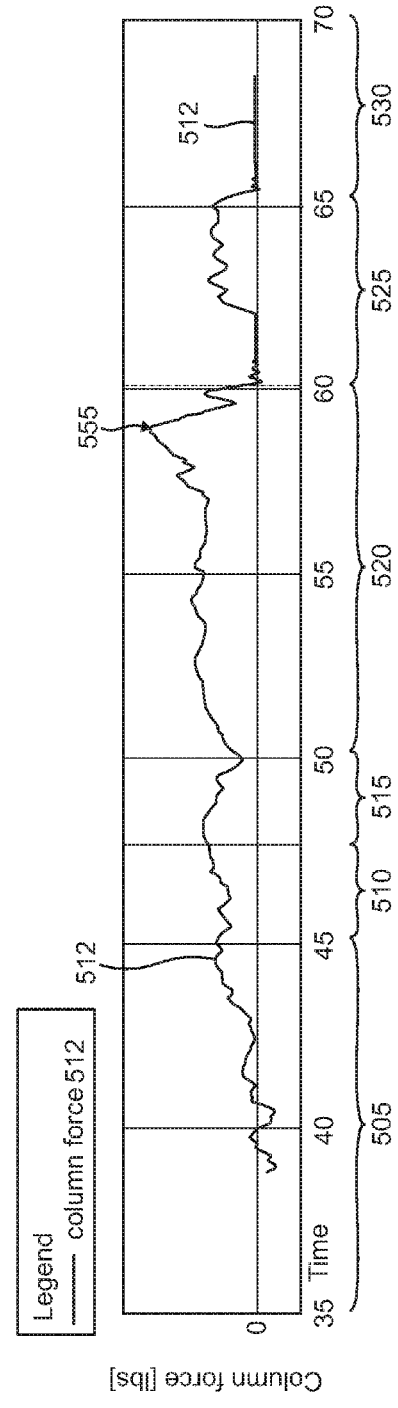
Figure 5C:
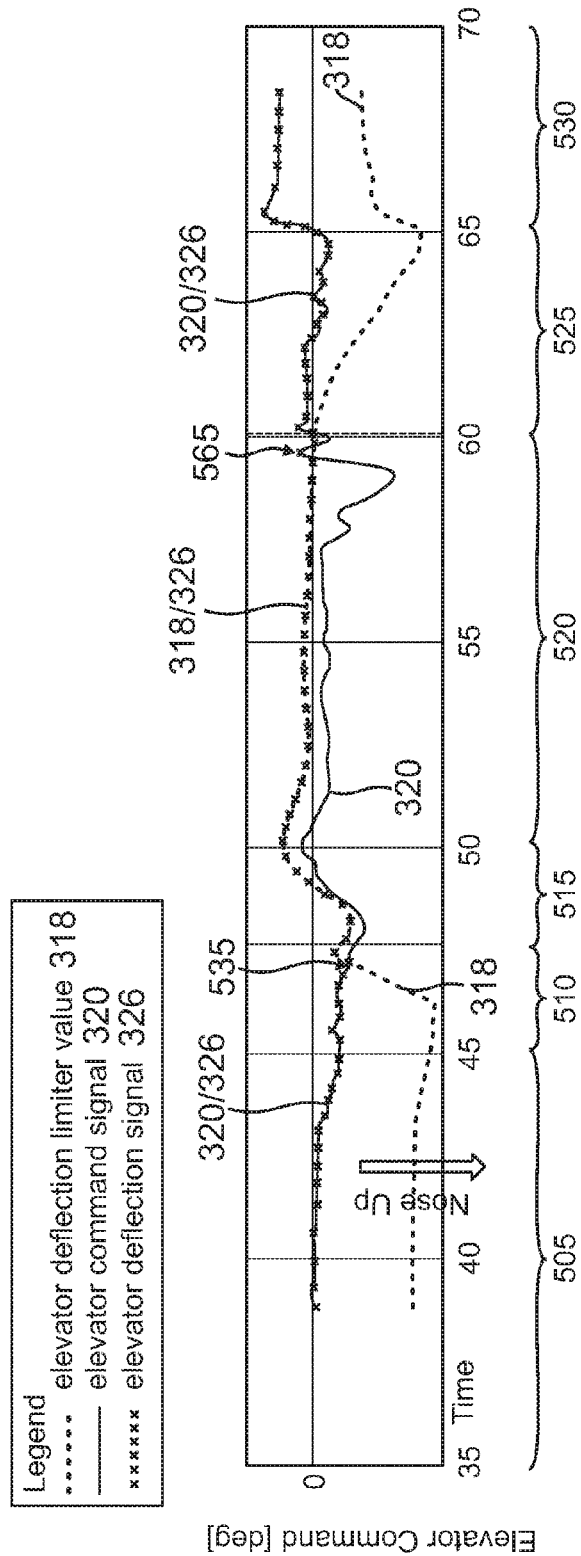

FIGS. 5A through 5C illustrate time sequence plots of an abusive aircraft 100 landing maneuver in accordance with embodiments of the disclosure. FIGS. 5A through 5C illustrate plots of parameters associated with tail strike avoidance system 300 during an aircraft 100 landing maneuver. Time sequence plots of FIGS. 5A through 5C include pitch attitude 106, current pitch profile θ' 306, maximum pitch profile 304, pilot and/or autopilot elevator command signal 320, and elevator deflection limiter value 318 plotted during sequential periods of the landing maneuver. Time on the x-axis of FIGS. 5A through 5C is divided into periods 505, 510, 515, 520, 525, and 530. 5A illustrates a time sequence plot showing pitch attitude 106, current pitch profiles θ' 306, and maximum pitch profiles 304 in degrees. FIG. 5A illustrates aircraft 100 aft body 142 clearance to runway surface 102 in feet. FIG. 5B illustrates the time sequence of FIG. 5A showing a plot of column force 512, in pounds, when pilot asserts an elevator deflection. FIG. 5C illustrates the time sequence of FIG. 5A showing a plot of elevator command signal 320, elevator deflection limiter value 318, and output elevator deflection signal 326 in degrees of elevator deflection.

Period 505 may correspond to aircraft 100 approaching runway 102. As shown in FIG. 5A, degrees of pitch attitude 106 and current pitch profile θ' 306 may be approximately equal indicating no pitch rate 114. Column force 512 of FIG. 5B is also approximately zero, indicating the pilot is not attempting to pitch aircraft 100. FIG. 5C shows output elevator deflection signal 326 is equal to elevator command 320 indicating limiter 319 is not limiting elevator command 320. Elevator deflection limiter value 318 is substantially below zero indicating the current pitch profile θ' 306 is substantially less than the maximum pitch profile 304.

Period 510 may correspond to aircraft 100 on a descent toward runway 102. As shown in FIG. 5A, degrees of current pitch profile θ' 306 and pitch attitude are both increasing indicating a nose-up attitude of aircraft 100. Furthermore, column force 512 is increasing indicating pilot is pitching aircraft 100. Aft body 142 is on a steep downward slope toward runway surface 102. As aft body 142 approaches runway surface 102, maximum pitch profile 304 is decreasing indicating aft body 142 clearance to runway surface 102 is decreasing. Elevator deflection limiter value 318 of FIG. 5C is moving in a positive response to aft body 142 reduction in clearance to runway surface 102. At a point 535 in period 510 of FIG. 5C, elevator deflection limiter value 318, elevator command signal 320, and elevator deflection signal 326 intersect. Time 535 corresponds to an aft body 142 height near runway surface 102. Thereafter, elevator deflection signal 326 is limited by limiter 319 as shown in FIG. 5C. Pilot may be commanding additional negative elevator deflection 120 as shown in FIG. 5C. In response to column force 512, elevator command signal 320 may be commanding additional degrees negative elevator deflection as indicated by FIG. 5C. However, limiter 319 is limiting elevator command signal 320 to a negative elevator deflection value 326 greater than elevator command signal 320.

Period 515 corresponds to aft body 142 continuing to approach runway surface 102. As shown in FIG. 5A, aft body 142 approaches to nearly zero feet from runway surface 102 as indicated by time 545. Maximum pitch profile 304 continues to decrease during a time prior to aft body approaching runway surface 102. Thereafter, maximum pitch profile 304 remains constant. Current pitch profile θ' 306 and pitch attitude 106 both show an overshoot beyond maximum pitch profile 304. Column force is decreasing during period 515 as pilot may be provided information on display 240 that aft body 142 is approaching runway surface 102. However, elevator deflection limiter value 318 is commanding elevator 116 to respond with a nose down pitching moment 112 and elevator deflection signal 326 is responding to limiter 319 with positive elevator deflection.

Period 520 may correspond to aircraft 100 decelerating down runway surface 102. In this regard, aft body 142 clearance to runway surface 102 is moving away from runway surface 102. Pitch attitude 106 is approximately equal to maximum pitch profile 304 during this period indicating pitch attitude 106 is limited by maximum pitch profile 304 when conditions have stabilized. Elevator deflection limiter value 318 value of nose down command is decreasing during the period and elevator deflection signal 326 is responding to limiter 319. Elevator command signal 320 is being limited during this period. In this regard, time 555 indicates a strong column force corresponding to pilot commanding a significant change in elevator deflection. Elevator command signal 320 responds with a significant nose-up position. However, as indicated by FIG. 5C, elevator command signal 320 at time 555 is being limited by limiter 319 as elevator deflection signal 326 does not respond to the pilot input and continues to track to elevator deflection limiter value 318. Furthermore, time 565 indicates elevator deflection signal 326 may respond to elevator command signal 320 as degrees of elevator command signal 320 is greater than elevator deflection limiter value 318.

Period 525 may correspond to aircraft 100 de-rotating to runway surface 102. In this regard, aft body 142 is rotating up from runway surface 102 to the aft body 142 normal height. Pitch attitude 106 and current pitch profile θ' 306 are decreasing indicating a negative pitch rate (e.g., a nose down). FIG. 5C indicates once again that the current pitch profile θ' 306 is less than the maximum pitch profile 304 as elevator deflection signal 326 is responding to elevator command signal 320 and elevator deflection limiter value 318 is decreasing significantly.

Period 530 may correspond to aircraft 100 taxiing on runway surface 102. In this regard, aft body clearance to runway surface remains constant. Pitch attitude 106 and current pitch profile θ' 306 remain constant. Furthermore, column force 512 is zero and elevator command signal 320, elevator deflection signal 326, and limiter 319 are constant.

In view of the present disclosure, it will be appreciated that by using pitch profile and descent profiles to determine a limiting elevator deflection value implemented in accordance with various embodiments set forth herein may provide for an improved approach to prevent the aft body of the aircraft from contacting the ground during an aircraft landing maneuver. In this regard, limiting an elevator deflection value, while still providing aircraft landing control, allows an aircraft, such as a long bodied commercial aircraft, to use a lower landing approach speed than would otherwise be necessary to avoid tail strikes. A pilot may rely on increased landing speed to avoid a tail strike in conventional systems. Lower approach speeds can have a positive effect on a number of aircraft systems and performance metrics including landing field length, high lift, and noise.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as program code and/or data, can be stored on one or more computer readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the present invention. Accordingly, the scope of the invention is defined only by the following claims.

What is claimed is:

1. A method comprising:
   determining a descent profile based on a current altitude and a current vertical speed of an aircraft;
   determining a maximum pitch profile associated with the descent profile;
   determining a current pitch profile based on a current pitch attitude and a current pitch rate of the aircraft;
   comparing the current pitch profile with the maximum pitch profile to determine an excess pitch profile;
   determining a deflection lower limit associated with an elevator of the aircraft for the excess pitch profile;
   receiving an elevator command signal having an associated elevator deflection;
   if the associated elevator deflection is greater than the deflection lower limit, passing the elevator command signal to actuate the elevator in accordance with the associated elevator deflection;
   if the associated elevator deflection is less than the deflection lower limit, limiting the elevator command signal to actuate the elevator in accordance with the deflection lower limit to reduce a probability of a tail strike by the aircraft; and
   applying a lag filter to an elevator command signal output to provide a low frequency feedback signal of the elevator command signal output.

2. The method of claim 1, wherein the current altitude is based on a distance from an aircraft landing gear to a runway surface as determined, at least in part, by a sensor measurement signal.

3. The method of claim 1, wherein the determining the maximum pitch profile includes accessing a table of maximum pitch profiles, wherein each maximum pitch profile is based on a corresponding descent profile, and wherein the maximum pitch profile is determined, at least in part, on the descent profile and an aircraft geometry.

4. The method of claim 1, further comprising reducing the maximum pitch profile when a speed brake is extended.

5. The method of claim 1, wherein:
   the current vertical speed is determined by a vertical speed sensor measurement signal;
   the current pitch rate is determined by a pitch rate sensor measurement signal; and
   the current pitch attitude is determined by a pitch attitude sensor measurement signal.

6. The method of claim 1, wherein the determining the deflection lower limit comprises converting the excess pitch profile to degrees of elevator deflection.

7. The method of claim 1, wherein the determining the deflection lower limit further comprises summing the low frequency feedback signal and the excess pitch profile.

8. The method of claim 1, further comprising periodically updating the descent profile and the current pitch profile.

9. The method of claim 1, further comprising actuating the elevator in accordance with at least one of the passed or limited elevator command signals.

10. The method of claim 1, wherein the deflection lower limit corresponds to a negative elevator deflection.

11. A system comprising:
a memory comprising a plurality of executable instructions; and
a processor adapted to execute the instructions to:
determine a descent profile based on a current altitude and a current vertical speed of an aircraft;
determine a maximum pitch profile associated with the descent profile;
determine a current pitch profile based on a current pitch attitude and a current pitch rate of the aircraft;
compare the current pitch profile with the maximum pitch profile to determine an excess pitch profile;
determine a deflection lower limit associated with an elevator of the aircraft for the excess pitch profile;
receive an elevator command signal having an associated elevator deflection;
if the associated elevator deflection is greater than the deflection lower limit, pass the elevator command signal to actuate the elevator in accordance with the associated elevator deflection;
if the associated elevator deflection is less than the deflection lower limit, limit the elevator command signal to actuate the elevator in accordance with the deflection lower limit to reduce a probability of a tail strike by the aircraft; and
apply a lag filter to an elevator command signal output to provide a low frequency feedback signal of the elevator command signal output.

12. The system of claim 11, wherein the current altitude is based on a distance from an aircraft landing gear to a runway surface as determined, at least in part, by a sensor measurement signal.

13. The system of claim 11, wherein the maximum pitch profile is determined, at least in part, on the descent profile and an aircraft geometry.

14. The system of claim 11, further comprising an aircraft speed brake, wherein the maximum pitch profile is reduced when the speed brake is extended.

15. The system of claim 11, wherein the processor is configured to periodically update the current pitch profile and the descent profile.

16. The system of claim 11, wherein the processor is further configured to convert the excess pitch profile to degrees of elevator deflection.

17. The system of claim 11, wherein the processor is further configured to sum the low frequency feedback signal and the excess pitch profile.

18. The system of claim 11, wherein the system is an aircraft further comprising:
a pitch attitude sensor configured to provide a pitch attitude measurement signal to the processor;
a pitch rate sensor configured to provide a pitch rate measurement signal to the processor;
a vertical speed sensor configured to provide a vertical speed measurement signal to the processor; and/or
a radio altimeter configured to provide an altitude measurement signal to the processor.

19. The system of claim 11, wherein the deflection lower limit corresponds to a negative elevator deflection.

* * * * *